United States Patent [19]

O'Neill

[11] 4,309,391

[45] Jan. 5, 1982

[54] LUMP PROCESS ALPHA GYPSUM

[75] Inventor: Eugene O'Neill, Okeene, Okla.

[73] Assignee: United States Gypsum Company, Chicago, Ill.

[21] Appl. No.: 212,464

[22] Filed: Dec. 3, 1980

[51] Int. Cl.³ .................. C04B 11/02; C01F 11/46
[52] U.S. Cl. .................................. 423/172; 106/110; 423/555
[58] Field of Search ............... 106/109, 110; 423/171, 423/172, 555

[56] References Cited

U.S. PATENT DOCUMENTS

| | | | |
|---|---|---|---|
| 1,901,051 | 3/1933 | Randel et al. | 423/172 |
| 1,931,240 | 10/1933 | Randel et al. | 423/172 |
| 2,418,590 | 4/1947 | Linzell et al. | 423/172 |
| 2,907,667 | 10/1959 | Johnson | 423/172 |
| 2,907,668 | 10/1959 | Nies et al. | 423/172 |
| 3,081,152 | 3/1963 | Johnson | 423/172 |
| 3,437,330 | 4/1969 | Worner | 423/172 |
| 4,234,345 | 11/1980 | Fassle | 423/172 |

FOREIGN PATENT DOCUMENTS

| | | | |
|---|---|---|---|
| 567797 | 12/1958 | Canada | 423/172 |
| 1079502 | 8/1967 | United Kingdom | 423/172 |
| 1253363 | 11/1971 | United Kingdom | 423/172 |
| 307075 | 6/1971 | U.S.S.R. | 423/172 |

*Primary Examiner*—Gary P. Straub
*Attorney, Agent, or Firm*—Kenneth E. Roberts; R. H. Robinson; S. Kurlandsky

[57] ABSTRACT

An improved "lump" process for producing alpha gypsum, calcium sulfate hemihydrate, from natural gypsum rock of the type wherein lumps of gypsum rock particles (a minimum of about ½ inch or 1.3 cm. in size) are calcined to low water-demand alpha hemihydrate by autoclaving in a saturated steam atmosphere, quickly dried and pulverized is disclosed. The improvement allows the thorough processing of natural gypsum as large sized particles or containing considerable selenite and includes the steps of initiating calcination without crystal habit modifier and, after hemihydrate formation has commenced, adding crystal habit modifier and completing calcination under increased steam pressure.

6 Claims, 6 Drawing Figures

FIG. 1   SOURCE A   SELENITIC
FIG. 2   SOURCE B   POROUS

FIG. 3  OUTSIDE EDGE .065% chm
FIG. 4  INTERIOR  .065% chm

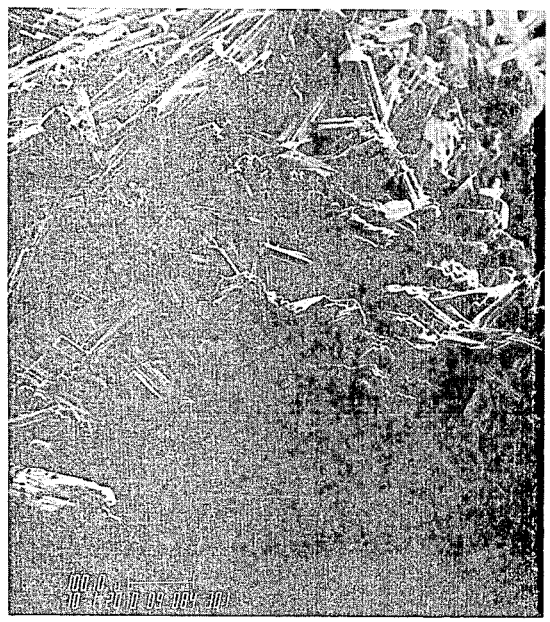
FIG. 5   INTERIOR   1.2% chm
FIG. 6   INTERIOR   3.7% chm

LUMP PROCESS ALPHA GYPSUM

BACKGROUND OF THE INVENTION

(1) Field of the Invention

This invention relates to an improved process for calcining gypsum rock to hemihydrate. More particularly this invention relates to an improvement in the calcination of lump gypsum rock to alpha hemihydrate. In such processes gypsum rock is calcined to alpha hemihydrate under steam pressure using coarsely pulverized rock in excess of ½ inch (1.3 cm) diameter pieces.

Alpha hemihydrate calcium sulfate is generally prepared by dehydration of gypsum in water at temperatures above 95° C. and by disassociation in an atmosphere of saturated steam. Typically in the calcination of gypsum rock, rock from the mine or quarry is crushed and sized to meet the requirements of the calcination processing e.g, either the so-called "lump" gypsum rock processes in which the rock is coarsely ground or the so-called "slurry" type of process in which a powder of the gypsum is suspended in a solution of crystal habit modifier and autoclaved.

"Lump" process gets its name from the first commercially successful means of obtaining alpha hemihydrate, having a low normal pouring consistency, disclosed in U.S. Pat. No. 1,901,051. This method involves charging lumps of gypsum to an autoclave and calcining under saturated steam pressure of 15-20 psi gauge for 5-7 hours, then drying and grinding the product. In practice small lumps are preferred and long calcination cycles are required even to produce a 40-50 cc consistency product. U.S. Pat. No. 2,907,667 taught that calcination time could be markedly decreased without substantial increase in consistency of the product if the lumps, sized between ½ to 1½ inches, were first soaked in a crystal-habit-modifier solution of about 10% concentration with a wetting agent to wet them and the solution drained off; then calcining at the usual lower pressure for a length of time and then progressively increasing the pressure. U.S. Pat. No. 2,907,668 added the variant of percolating the crystal-habit-modifier solution through the gypsum rock mass, at a rate of 1 pound of 1-3% solution per 7 pounds of rock, for 3-7 hours during the early calcination, generally 3 hours, followed by 1-3 hours of calcination without the solution. U.S. Pat. No. 2,616,789 disclosed additional crystal-habit-modifiers; and U.S. Pat. No. 2,913,308 found that lower consistency product could be obtained by using smaller particles with a top size of ½ inch with a crystal-habit-modifier solution during the usual low pressure first part of the calcination cycle, withdrawing the solution from the partly converted gypsum and continuing the calcination under increased pressures to complete the conversion. Finally, U.S. Pat. No. 3,081,152 teaches that the processing times may be considerably shortened in the foregoing processes by a defined scheduling of incremented pressure increases during calcining. Thereby the normal calcination time of the '051 patent was reduced from about 5 hours to less than 3; the '668 percolation method from 8 to about 5 hours; and the '667 soak method reduced about 50% from the original 9-16 hours.

However there are a few gypsum rocks which are difficult to calcine into low consistency products, and further the uniformity of piece size in the crushed rock stream being diverted to lump process calcination greatly affects production.

One of these difficulties occurs when the natural gypsum massive rock includes veins of a pure gypsum crystalline form called selenite. Selenite is a tabular monoclinic crystalline form. Although the individual grains in a massive gypsum rock may actually be small, inhibited selenite crystallites, there are some gypsum ores that contain uninhibited, much larger and well formed, crystals of selenite possibly ¼ inch to as large as 2 inches in diameter after sizing in normal crushing equipment. Being monolithic these pieces of selenite require more time at the same pressure or greater pressure in the same time for conversion than the small grains of massive gypsum require. Heat can penetrate around and into the grains of massive gypsum more readily than through the crystalline structure of selenite. For example if a selenite vein is encountered, the low consistency product may be maintained by raising the pressure e.g., to 20 psig instead of 14 psig saturated steam and/or increasing the cycle time e.g., from a 5 hour cycle to an 8-10 hour cycle in the '152 patent's cycle improvement to the Randell and Dailey '051 patent process. Thus the introduction of some selenite in the rock supply will either require wasting of calcination time and steam supply in the overcooking of the massive grains or in carrying through some unconverted product raising consistencies of the production batch. Further the resulting alpha hemihydrate continues to give more trouble in that alpha hemihydrate from selenitic crystal yields a ground product of a higher aspect ratio. Under the same conditions of grinding, alpha hemihydrate from selenite will have an aspect ratio around 2-3:1 whereas alpha hemihydrate from the grains of massive gypsum rock will have an aspect ratio much closer to 1:1. It is harder to grind, and it tends during grinding to maintain the preferred orientation for tabular form.

Another problem encountered in all lump alpha hemihydrate production is that only a small part of the rock stream from the crusher may be utilized. As larger pieces on the order of 2 inches-2¼ inches, or a higher proportion of pieces that significantly deviate from the median in a ¼ to 1½ inch range find their way into the rock stream, increased pressures and lengthened calcination times and/or increased crystal-habit-modifier solution must be reverted to in order to obtain uniform product. Again this results in longer cycle times, more crystal-habit-modifier solution usage and higher consistencies in the resulting product.

For both of the above reasons there is a need to improve the lump processes to maintain a low consistency product without increasing the cycle time thereby slowing the rate of production, and without increasing the steam pressure utilized thereby increasing the cost of production and encountering unreactive product in general; and further in particular being able to produce a low consistency product from rock containing substantial proportions of selenite.

Further it would be desirable while maintaining low consistency product to be able to increase the portion of rock feed coming from the rock crusher that may be utilized in the production of alpha hemihydrate; to decrease the cycle time used for massive gypsum rock and to avoid having to increase substantially both the cycle times and pressures required when veins of selenite are encountered.

SUMMARY OF THE INVENTION

Surprisingly it has now been found that initiating calcination without crystal-habit-modifier opens up the rock structure to make subsequent addition of crystal-habit-modifier more effective and thereby accomplish the above and further objects and advantages.

BRIEF DESCRIPTION OF THE DRAWING

FIGS. 1–6 are scanning electron microscopic photomicrographs at 100X of raw gypsum and of alpha hemihydrate in the presence of variable amounts of crystal modifier solution in accordance with this invention.

DETAILED DESCRIPTION OF THE PREFERRED EMBODIMENTS

EXAMPLE 1

An evaluation was performed on a gypsum quarry source (source A, FIG. 1) that contained large inclusions of selenite that resisted normal calcination pressures and cycle times. Ordinarily, a satisfactory alpha hemihydrate product having a maximum consistency specification of 42 cc would be produced by calcining massive gypsum rock not containing selenite from this source sized between ⅝ inch and 1⅜ inch over a total cycle time of 3 hours with a first low pressure saturated steam treatment at about 14 psig steam for about ⅔ cycle and 24 psig for the remaining ⅓ of the cycle. This resulted usually in a product, when ground to Blaine surface area of 3800–4400 square centimeters per gram, of 41½ cc consistency. The use of rock containing large amounts of selenite that resisted normal calcination pressures and a top rock size of 2 inches in the screen sizing under the same cycle conditions resulted in an alpha hemihydrate of 44 cc normal consistency. Adjustments in cycle structure and variations in saturated steam pressure did not accomplish meeting minimum consistency specifications. Even removing all of the rock feed larger than 1¾ inch still did not allow meeting consistency specification i.e., consistency was lowered only about ½ cc.

In a first evaluation the steam pressure from the autoclave was released just at the end of the low pressure portion of the cycle and, after removing the lid, various concentrations of succinic acid were added in 5 gallon portions of water and poured over the 4,000 pounds of rock. After closing the lid to the autoclave, the pressure was raised to 25 psig for 15 minutes, then to 30 psig for 30 minutes and then finally to 40 psig for 35 minutes. Samples of calcined and ground material gave the following results:

TABLE I

| Sample | Normal Consistency | Johnson Consistometer* | % Plus 325 Mesh |
|---|---|---|---|
| Untreated Selenitic Control | 44 cc | 7½ Inches | 2.00% |
| +0.6% Succinic Acid | 42 cc | 8¼ Inches | 5.60% |
| +0.3% Succinic Acid | 42 cc | 7 15/16 Inches | — |
| +0.15% Succinic Acid | 43 cc | 7⅞ Inches | — |

NOTE:
*300g plaster, 135cc water and 0.1g sodium citrate, soak for 1 minute and hand stir ½ minute.

In the above evaluation, calcination of the selenite containing rock at higher pressures in the same 3 hours cycle or less produced satisfactory consistency at 0.3% and 0.6% addition.

EXAMPLE 2

In another series of evaluations, instead of releasing the steam pressure which, though improving the consistency, added approximately 10 minutes cycle time, source A material was treated by introducing succinic acid solution to the rock by pumping the solution at 40 psig through a ½ inch pipe through a spray head. Just before adding the solution, the steam pressure was shut off to allow greater penetration of the solution and to allow lower pumping pressures. Using 10 gallons of solution, the addition time was 20–25 seconds; and with 20 gallons of solution it was 40–45 seconds. Immediately after pumping the solution onto the rock the steam was turned back on and the cycle resumed. The remainder of the cycle was 15 minutes at 25 psig, 15 minutes at 30 psig, 15 minutes at 35 psig and 30 minutes at 40 psig for the 1.2% addition and 20 minutes at 25 psig, 15 minutes at 30 psig, 15 minutes at 35 psig and 30 minutes at 40 psig for the 0.6% addition. Evaluation of the calcined and ground product was as follows:

TABLE II

| Sample | Normal Consistency | Johnson Consistometer | % Plus 325 Mesh |
|---|---|---|---|
| Untreated Selenitic Control | 44 cc | 7⅝ Inches | 1.35% |
| +1.2% Succinic Acid | 42 cc | 8 5/16 Inches | 3.95% |
| +0.6% Succinic Acid | 42 cc | 7 15/16 Inches | 2.95% |

EXAMPLE 3

In another comparative evaluation 2.5 ton batches of gypsum rock having a particle size between ⅝ and 2 inches were placed in a wire basket and lowered into an autoclave. The gypsum rock was from source B (FIG. 2) having a 97.7% purity as calcium sulfate and not containing any substantial selenite inclusions. 40 gallons of a solution containing 5% succinic anhydride, 0.5% potassium sulfate and a small amount of surface active wetting agents were sprayed over the rock during a 5 minute interval and the rock was allowed to soak up the solution over an additional 45 minute interval; then the lid to the autoclave was closed. Steam was introduced into the autoclave to bring the pressure in the autoclave to about 20 lbs. per square inch gauge; and this pressure was maintained for 1 hour. The pressure was increased to about 22 psig for 3.5 hours then gradually increased on a prescheduled cycle to 40 psi gauge for a total of 6.5 hours heating time before the autoclave was dumped. This was a total of 7.4 hours cycle time including the time for treating the gypsum particles with the crystal-habit-modifier solution and soaking time before calcination commenced. The calcined rock was dried and ground to a fineness of 99% through a 100 mesh sieve. This hemihydrate had a consistency between 35 cc and 37 cc with a 25–30 minute Vicat set.

In accordance with the present invention, another batch of gypsum rock sized between ⅝ and 2 inches was placed in the same autoclave and, over a 2 minute interval 15 gallons of a solution containing 3.2% succinic anhydride, 0.5% potassium sulfate and a small amount of the same surface active wetting agent as used above was sprayed over the rock, the rock allowed to soak 10 minutes, the lid closed and steam was introduced. This time 30 minutes after the pressure in the autoclave had been adjusted to 22 psig the pressure was released and the lid opened. The rock was allowed to cool 30 minutes and an additional 25 gallons of the crystal-habit-modifier solution were sprayed over the rock during a 3 minute interval; and the rock allowed to soak up the solution for 20 minutes. The autoclave was closed and the pressure increased to 22 psig for 1 hour. Then pressure was over a 5 minute interval bled off to 10 psig to remove condensate and accumulated chemically combined water and then again increased to 40 psi gauge under the same schedule used herein above for a total heating time after the second addition of crystal-habit-modifier solution of 5.08 hours before the autoclave was dumped. Even allowing for the interruption in heating for the second addition of crystal-habit-modifier and time for it to soak into the rock the total cycle time was 6.7 hours. This is about ¾ hour shorter total process time and over 1 hour less heating time under steam. After drying and grinding under the same conditions, the consistency was found to be 34 cc-36 cc with the Vicat set being 25-30 minutes. A comparison of these two runs will show not only was less crystal-habit-modifier solution used, for a lower concentration, but also a shortened processing time was achieved while lowering consistency. U.S. Pat. No. 2,907,667 clearly teaches that with a decrease in the concentration of the crystal-habit-modifier solution, there is a decreased calcination time but an increase in the consistency. Quite surprisingly, not only was a coarser rock enabled to be processed but a lower consistency was obtained in lessened time with lessened concentrations and lessened amounts of crystal-habit-modifiers solution.

Further illustrative of the invention a partly converted gypsum rock was pulled out of the autoclave when it was opened for addition of the crystal modifier. That rock was immersed for a few minutes into a dark green dye solution. Comparing an unprocessed rock treated in the same manner revealed that the dye had colored the partly converted rock to a much deeper tint and penetrating at least twice as far into the sample than in the untreated rock. To further illustrate the present invention two-inch cubes were sawed from a single piece of Source A selenitic rock and calcined under the same conditions of 1 hour at 14 psig steam, immersion in a crystal modifier solution for a few minutes, then resuming calcination for 1 hour at 25 psig, 30 minutes at 30 psig and 30 minutes at 40 psig. The cubes were then broken to expose a fresh surface from the outside to the center of each cube; and samples submitted to scanning electron microscopic examination. The crystal habit modifier solutions used and corresponding photomicrographs were:

| Photo & Location In Sample | Crystal Habit Modifier Solutions (CHM) | | |
|---|---|---|---|
| | Succinic Acid | Potassium Sulfate | Wetting Agent |
| FIG. 3 - Outside Edge of Sample | 0.065% | — | — |
| FIG. 4 - Interior Center of Sample | 0.065% | — | — |
| FIG. 5 - Interior Center of Sample | 1.2% | — | — |
| FIG. 6 - Interior Center of Sample | 3.2% | 0.5% | 0.002% |

FIG. 3 is representative of the outside of all the cubes, i.e. near the surface of the rock. FIGS. 4–6 show an ever increasing tendency representative of all the cubes towards shorter, thicker alpha hemihydrate crystals and in greater quantities at the interior of the cubes in accordance with the present invention, with the crystals in FIG. 6 yielding the lowest normal consistency in this series.

At the end of the above operations, the product is quickly dried without allowing it to fall to a temperature at which rehydration would take place and ground in a suitable attrition means to an appropriate fineness.

It is apparent from the above that any of the customary crystal-habit-modifier materials known in the art may be used such as the dicarboxylic acid crystal habit modifiers referred in the afore-identified U.S. Pat. No. 2,907,688 and the vapor pressure depressant salts of alkali metal, ammonium or alkaline earth metals as referred to in the aforementioned U.S. Pat. No. 2,616,789, and mixtures thereof. Throughout the description of this invention, the term "crystal-habit-modifier" is to be construed as meaning such materials. Further the various wetting agents may be added to the crystal-habit-modifier solution such as referred to in U.S. Pat. Nos. 2,907,667 and 2,907,668.

It is apparent that no particular apparatus is required as the product can be prepared in ordinary autoclaves which need not be equipped with any stirrers or agitators since a state of quiescence prevails. Further various adjustments may be made in steam pressures and cycle times as disclosed in the aforementioned patents. Since aqueous solution of crystal-habit-modifier is introduced in the heating cycle it is not in fact necessary that the heating cycle be accomplished by a steam calcination phase as a satisfactory product may be obtained merely by heat and pressure calcining the lump gypsum with late addition of the solution of crystal-habit-modifier, with or without the further addition of surface active agents. Other variations and equivalents, as will readily suggest themselves to those skilled in these arts, are to be construed as within the scope and purview of the present invention as claimed.

What is claimed is:

1. In a process for the production of alpha calcium sulfate hemihydrate crystals of the type wherein lump gypsum particles of at least about ½ inch size are calcined at steam pressures of 13 to 60 psi gauge in a state of quiescence and with an at least first lower pressure cycle and a second higher pressure cycle, dried and ground to obtain calcium sulfate hemihydrate having a low normal consistency, the improvement comprising:
   heating under the lower pressure cycle without a crystal habit modifier to convert at least a substantial but minor part of the gypsum to hemihydrate;
   intermediate the low pressure and high pressure cycles adding an aqueous solution of crystal-habit-modifier; and
   continuing calcination under steam pressure until substantially all of the gypsum particles are converted to hemihydrate crystals.

2. In a process for producing alpha calcium sulfate hemihydrate crystals of the type wherein lump gypsum particles of at least about ½ inch size are calcined under steam pressures of 13 to 60 psi gauge in a state of quiescence and with a first lower pressure cycle with an aqueous solution of crystal-habit-modifier and a second higher pressure cycle, drying and grinding the product to obtain calcium sulfate hemihydrate having low normal consistency, the improvement of adding crystal-habit modifier solution in a plurality of discontinuous portions comprising:

applying a first portion of the crystal-habit-modifier solution to the surface of the gypsum particles before autoclave calcination; and intermediate the lower pressure and higher pressure cycles adding in at least one second distinct portion, the remainder of the crystal-habit-modifier solution; and continuing calcination under steam pressure until substantially all of the gypsum particles are converted to hemihydrate crystals.

3. The process according to claim 1 or 2 in which the gypsum particles are of the "selenitic" variety.

4. The process of claim 2 in which about ½ of the crystal-habit-modifier solution is added to treat the gypsum particles before autoclave calcination.

5. The process of claim 1 or 2 wherein the crystal-habit-modifier is selected from the group consisting of alkali and alkaline earth metal salts of sodium, potassium, magnesium, calcium, cesium, copper, zinc and of ammonia; aliphatic acids containing a dicarboxylic acid radical and having in its molecule at least two carboxyl groups separated by two carbon atoms with a single bond between intervening carbon atoms; and mixtures thereof.

6. The process of claim 5 in which the crystal-habit-modifier includes a succinic acid radical.

* * * * *